(12) United States Patent
Liu

(10) Patent No.: US 11,754,819 B2
(45) Date of Patent: Sep. 12, 2023

(54) ZOOM LENS MODULE

(71) Applicant: GUANGZHOU LUXVISIONS INNOVATION TECHNOLOGY LIMITED, Guangzhou (CN)

(72) Inventor: Chuan-Hui Liu, Guangzhou (CN)

(73) Assignee: GUANGZHOU LUXVISIONS INNOVATION TECHNOLOGY LIMITED, Guangzhou (CN)

( * ) Notice: Subject to any disclaimer, the term of this patent is extended or adjusted under 35 U.S.C. 154(b) by 40 days.

(21) Appl. No.: 17/577,360

(22) Filed: Jan. 17, 2022

(65) Prior Publication Data

US 2022/0244510 A1    Aug. 4, 2022

(30) Foreign Application Priority Data

Feb. 3, 2021   (CN) .......................... 202110149556.7

(51) Int. Cl.
*G02B 15/14*   (2006.01)
*G02B 13/00*   (2006.01)

(52) U.S. Cl.
CPC .. *G02B 15/144113* (2019.08); *G02B 13/0045* (2013.01)

(58) Field of Classification Search
CPC ............................................. G02B 15/144113
See application file for complete search history.

(56) References Cited

U.S. PATENT DOCUMENTS

| | | | | |
|---|---|---|---|---|
| 6,002,526 A * | 12/1999 | Okada | ..................... | G03B 13/12 359/686 |
| 6,031,669 A * | 2/2000 | Ohtake | .......... | G02B 15/144105 359/713 |
| 2007/0217024 A1* | 9/2007 | Kamo | ............ | G02B 15/144113 359/687 |
| 2009/0279183 A1* | 11/2009 | Mihara | ................ | G02B 15/142 359/691 |
| 2023/0116562 A1* | 4/2023 | Shim | ........................ | G03B 3/02 359/686 |
| 2023/0176347 A1* | 6/2023 | Shim | .................... | G02B 15/144 359/686 |

* cited by examiner

Primary Examiner — Darryl J Collins
(74) Attorney, Agent, or Firm — JCIPRNET

(57) ABSTRACT

A zoom lens module includes first to eighth lens elements sequentially arranged from an object end to an image end. The number of lens elements with refractive power in the zoom lens module is eight. The first lens element and the second lens element form a first lens element group. The third lens element and the fourth lens element form a second lens element group. The fifth lens element and the sixth lens element form a third lens element group. The seventh lens element and the eighth lens element form a fourth lens element group. The first lens element group and the fourth lens element group remain fixed during zooming. The second lens element group and the third lens element group move during zooming.

9 Claims, 7 Drawing Sheets

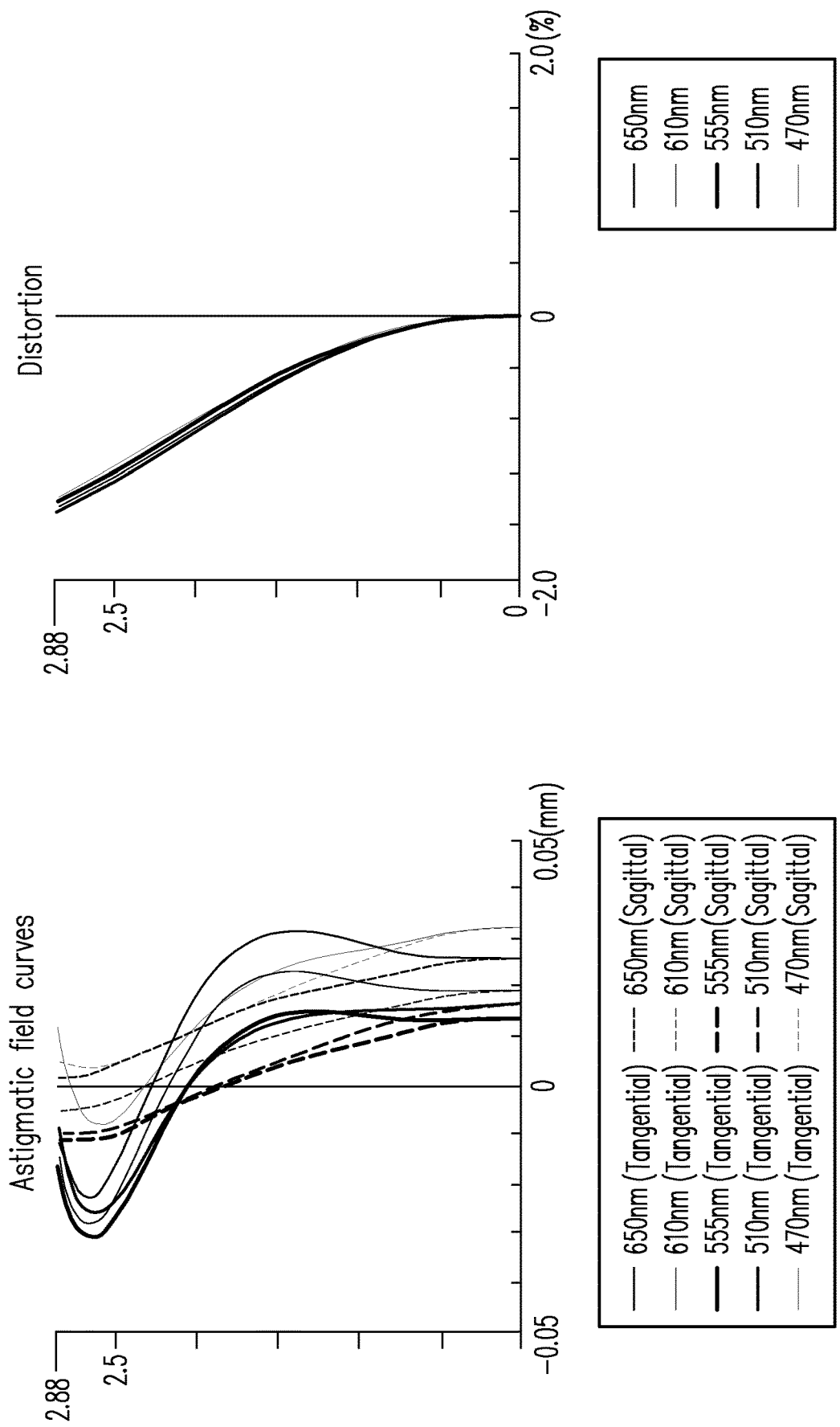

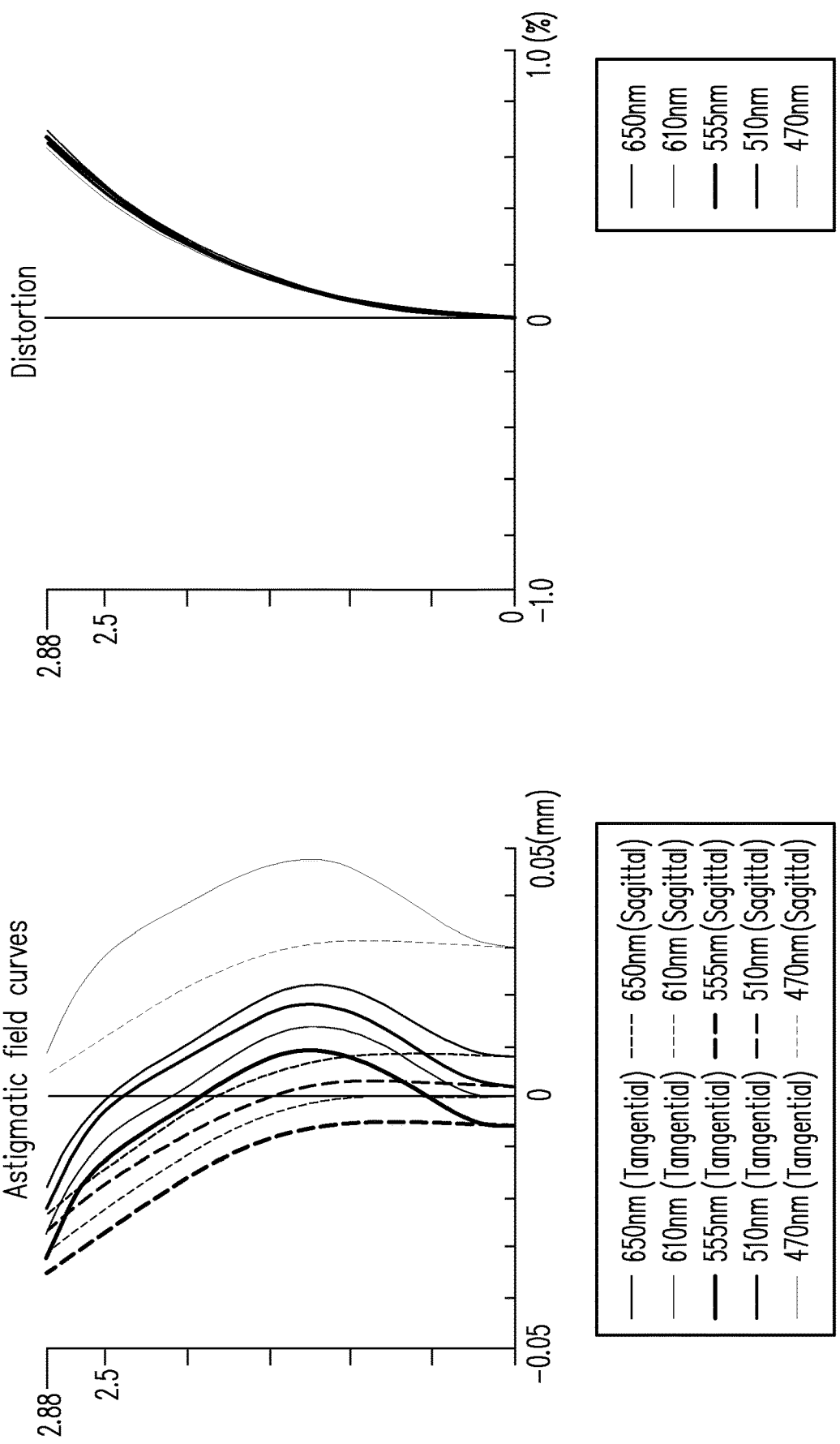

ZOOM LENS MODULE

CROSS-REFERENCE TO RELATED APPLICATION

This application claims the priority benefit of Chinese application no. 202110149556.7, filed on Feb. 3, 2021. The entirety of the above-mentioned patent application is hereby incorporated by reference herein and made a part of this specification.

BACKGROUND

Technical Field

The disclosure relates to a lens module. Particularly, the disclosure relates to a zoom lens module.

Description of Related Art

Currently, during telephoto zooming of a lens module of mobile devices (e.g., mobile phones, tablets, etc.), it is required to use multiple lens modules to cooperate with each other, and a resolution of a zoomed photo is decreased.

SUMMARY

The disclosure provides a zoom lens module, which provides continuous optical zooming.

A zoom lens module of the disclosure includes a first lens element, a second lens element, a third lens element, a fourth lens element, a fifth lens element, a sixth lens element, a seventh lens element, and an eighth lens element sequentially arranged from an object end to an image end. The number of lens elements with refractive power in the zoom lens module is eight. The first lens element and the second lens element form a first lens element group. The third lens element and the fourth lens element form a second lens element group. The fifth lens element and the sixth lens element form a third lens element group. The seventh lens element and the eighth lens element form a fourth lens element group. The first lens element group and the fourth lens element group remain fixed during zooming, and the second lens element group and the third lens element group move during zooming.

In an embodiment of the disclosure, refractive powers of the first lens element group, the second lens element group, the third lens element group, and the fourth lens element group are positive, negative, positive, and positive.

In an embodiment of the disclosure, the second lens element group moves from the object end to the image end during switching from a wide end to a telephoto end.

In an embodiment of the disclosure, the third lens element group moves from the image end to the object end during switching from a wide end to a telephoto end.

In an embodiment of the disclosure, refractive powers of the first lens element, the second lens element, the third lens element, the fourth lens element, the fifth lens element, the sixth lens element, the seventh lens element, and the eighth lens element are sequentially positive, negative, negative, positive, positive, negative, positive, and negative.

In an embodiment of the disclosure, the first lens element to the eighth lens element include seven aspheric lens elements and one spherical lens element.

In an embodiment of the disclosure, the first lens element to the eighth lens element are each an aspheric lens element.

In an embodiment of the disclosure, the zoom lens module also includes an aperture. The aperture is located between the fourth lens element and the fifth lens element.

In an embodiment of the disclosure, the zoom lens module also includes a sensor. The sensor is disposed at the image end. The zoom lens module meets following conditions: $5 < T/L < 10$, where T is a total length of lens, and L is a diagonal length of the sensor.

In an embodiment of the disclosure, the zoom lens module also includes a sensor. The sensor is disposed at the image end. The zoom lens module meets following conditions: $0.3 < (D11*fw)/(L*ft) < 0.9$, where D11 is a diameter of the first lens element, fw is an equivalent focal length at a wide end of the zoom lens module, L is a diagonal length of the sensor, and ft is an equivalent focal length at a telephoto end of the zoom lens module.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 8 and FIG. 9 are optical quality reference images at the wide end of a zoom lens module of a second example.

FIG. 10 and FIG. 11 are optical quality reference images at the telephoto end of the zoom lens module of the second example.

DESCRIPTION OF THE EMBODIMENTS

As mentioned herein, directional terms, such as "up", "down", "front", "rear", "left", "right", etc., are only for directions with reference to the drawings. Therefore, the direction terms are used for describing instead of limiting the disclosure.

In the accompanying drawings, each drawing shows the general properties of the method, structure, or material used in a particular embodiment. Nonetheless, these drawings should not be construed as defining or limiting the scope or nature covered by these embodiments. For example, for the sake of clarity, the relative size, thickness, and position of each film layer, region, or structure may be reduced or enlarged.

The terms "first" and "second" mentioned in this specification or the appended claims are only used to name different elements or distinguish different embodiments or ranges, and are not intended to limit the upper or lower bound of the number of elements, nor to limit the sequence of manufacturing or arranging the elements. In addition, the description that one element/film layer is disposed on (or above) another element/film layer covers a case where the element/film layer is directly disposed on (or above) the another element/film layer, and the two elements/film layers are in direct contact with each other; and a case where the element/film layer is indirectly arranged on (or above) the another element/film layer, and one or more elements/film layers are present between the two elements/film layers.

Figure 1:
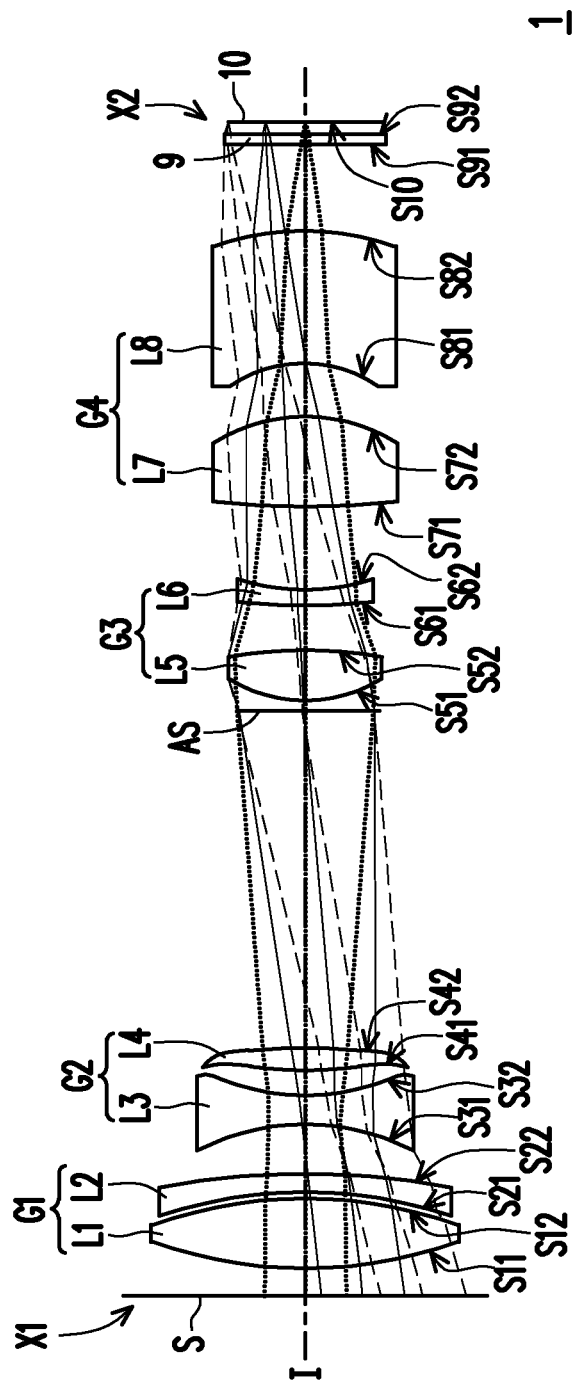
FIG. 1 to FIG. 3 are schematic diagrams at a wide end, a middle position, and a telephoto end of a zoom lens module according to an embodiment of the disclosure.
Figure 2:
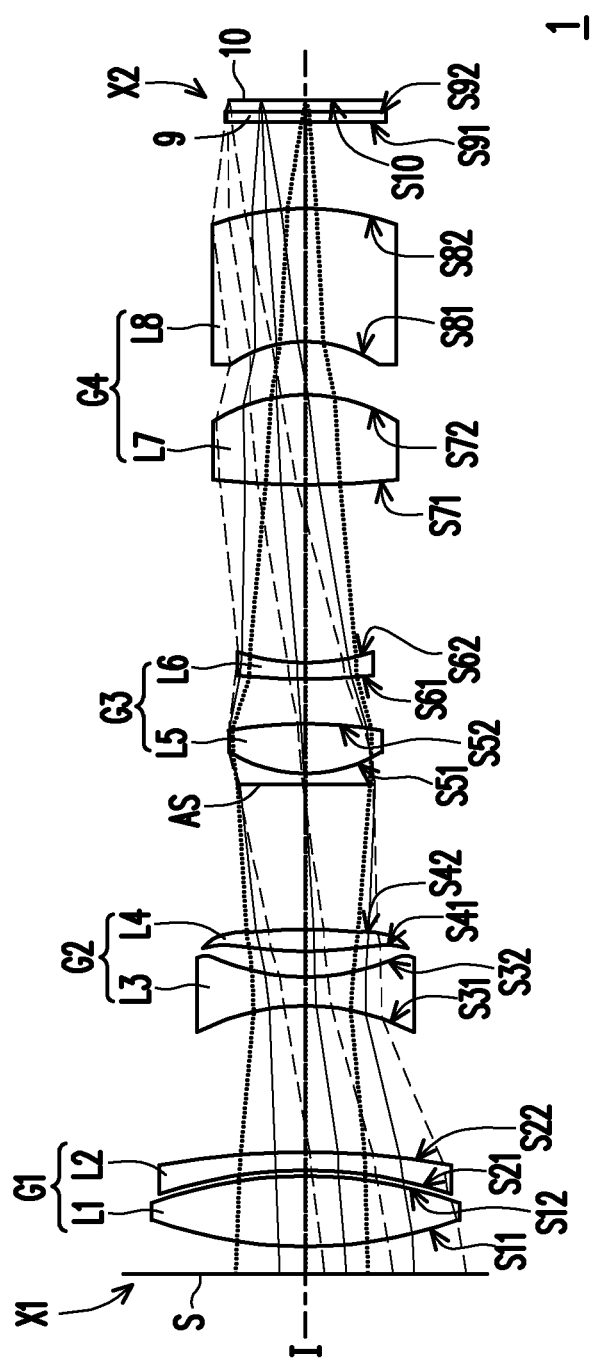
Figure 3:
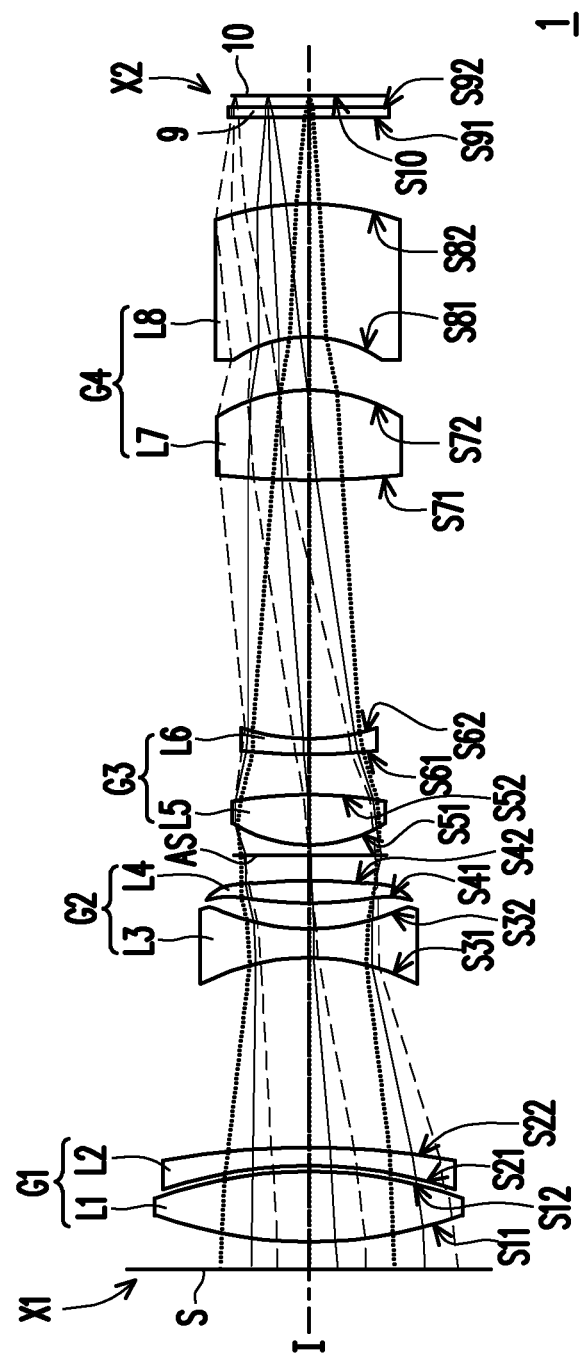

FIG. 1 to FIG. 3 are schematic diagrams at a wide end, a middle position, and a telephoto end of a zoom lens module according to an embodiment of the disclosure. With reference to FIG. 1 to FIG. 3, a zoom lens module 1 may be applied in an electronic device (for example, but not limited to, mobile phones or tablets) to capture images or videos of a target object S.

The zoom lens module 1 has an object end X1 and an image end X2. The object end X1 and the image end X2 are opposite ends of the zoom lens module 1. During capturing of images or videos of the target object S, the object end X1 is the end of the zoom lens module 1 facing the target object S, and the image end X2 is the end where a sensor 10 is located.

The zoom lens module 1 may include a first lens element L1, a second lens element L2, a third lens element L3, a fourth lens element L4, a fifth lens element L5, a sixth lens element L6, a seventh lens element L7, and an eighth lens element L8 sequentially arranged from the object end X1 to the image end X2. In the zoom lens module 1, only the above eight lens elements are lens elements with refractive power. That is, the number of lens elements with refractive power in the zoom lens module 1 is eight.

The material of the first lens element L1 to the eighth lens element L8 may be glass or plastic, but not limited thereto. In some embodiments, the first lens element L1 to the eighth lens element L8 may each be an aspheric lens element, but not limited thereto. In other embodiments, the first lens element L1 to the eighth lens element L8 may include seven aspheric lens elements and one spherical lens element.

In this embodiment, a refractive power of the first lens element L1 is positive, and the first lens element L1 is a biconvex lens element. A surface on an object side S11 and a surface on an image side S12 of the first lens element L1 are both aspheric, but not limited thereto. A refractive power of the second lens element L2 is negative, and the second lens element L2 is a convex-concave lens element with a convex surface (a surface on an image side S22) facing the image end X2. A surface on an object side S21 and the surface on the image side S22 of the second lens element L2 are both aspheric, but not limited thereto. A refractive power of the third lens element L3 is negative, and the third lens element L3 is a biconcave lens element. A surface on an object side S31 and a surface on an image side S32 of the third lens element L3 are both aspheric, but not limited thereto. A refractive power of the fourth lens element L4 is positive, and the fourth lens element L4 is a biconvex lens element. A surface on an object side S41 and a surface on an image side S42 of the fourth lens element L4 are both aspheric, but not limited thereto. A refractive power of the fifth lens element L5 is positive, and the fifth lens element L5 is a biconvex lens element. A surface on an object side S51 and a surface on an image side S52 of the fifth lens element L5 are both aspheric, but not limited thereto. A refractive power of the sixth lens element L6 is negative, and the sixth lens element L6 is a biconcave lens element. A surface on an object side S61 and a surface on an image side S62 of the sixth lens element L6 are both aspheric, but not limited thereto. A refractive power of the seventh lens element L7 is positive, and the seventh lens element L7 is a biconvex lens element. A surface on an object side S71 and a surface on an image side S72 of the seventh lens element L7 are both aspheric, but not limited thereto. A refractive power of the eighth lens element L8 is negative, and the eighth lens element L8 is convex-concave lens element with a convex surface (a surface on an image side S82) facing the image end X2. A surface on an object side S81 and the surface on the image side S82 of the eighth lens element L8 are both aspheric, but not limited thereto.

The first lens element L1 and the second lens element L2 form a first lens element group G1. A refractive power of the first lens element group G1 is positive, for example, which helps collecting light and/or eliminating basic aberrations. The third lens element L3 and the fourth lens element L4 form a second lens element group G2. A refractive power of the second lens element group G2 is negative, for example, which helps optical zooming. The fifth lens element L5 and the sixth lens element L6 form a third lens element group G3. A refractive power of the third lens element group G3 is positive, for example, to compensate for movement of the image point during optical zooming to fix the position of the image point without changing together with the optical zooming. The seventh lens element L7 and the eighth lens element L8 form a fourth lens element group G4. A refractive power of the fourth lens element group G4 is positive, for example, to converge light from the third lens element group G3 on an image plane (a light-sensing surface S10 of the sensor 10) and/or eliminate aberrations, or chromatic aberrations.

As shown in FIG. 1 to FIG. 3, the first lens element group G1 and the fourth lens element group G4 remain fixed during zooming, and the second lens element group G2 and the third lens element group G3 move during zooming. For example, the second lens element group G2 moves from the object end X1 to the image end X2 during switching from the wide end (FIG. 1) to the telephoto end (FIG. 3). In addition, the third lens element group G3 moves from the image end X2 to the object end X1 during switching from the wide end (FIG. 1) to the telephoto end (FIG. 3).

In the zoom lens module 1, one or more elements may be increased or decreased as required. For example, the zoom lens module 1 may further include an aperture AS. The aperture AS is located between the fourth lens element L4 and the fifth lens element L5. In other words, the aperture AS is located between the second lens element group G2 and the third lens element group G3. The aperture AS may move during zooming. For example, the aperture AS moves from the image end X2 to the object end X1 during switching from the wide end (FIG. 1) to the telephoto end (FIG. 3).

The zoom lens module 1 may also further include an optical filter 9 and the sensor 10. The sensor 10 is disposed at the image end X2. The optical filter 9 may be disposed between the fourth lens element group G4 and the sensor 10. For example, the optical filter 9 may be an infrared optical filter for filtering infrared light, but not limited thereto. The sensor 10 may include a charge coupled device (CCD) image sensing element or a complementary metal-oxide semiconductor (CMOS) image sensor element, but is not limited thereto. In an example, the sensor 10 may be a sensor with 32 million pixels, but not limited thereto.

In some embodiment, the zoom lens module 1 may meet the following conditions: $5<T/L<10$, where T is a total length of lens, and L is a diagonal length of the sensor 10. The total length of lens refers to the distance from a surface on an object side 51 of the first lens element L1 to the light-sensing surface S10 of the sensor 10 on an optical axis I. The diagonal length of the sensor 10 refers to the diagonal length of the photosensitive region of the sensor 10. In an example, T is 42 mm and L is 5.76 mm, but the disclosure is not limited thereto.

In some embodiment, the zoom lens module 1 may meet the following conditions: 0.3<(D11*fw)/(L*ft)<0.9, where D11 is a diameter of the first lens element L1, fw is an equivalent focal length at the wide end of the zoom lens module 1, and ft is an equivalent focal length at the telephoto end of the zoom lens module 1. The diameter of the first lens element L1 refers to the diameter of the effective region (optically effective region) of the first lens element L1. In an example, D11 is 10.8 mm, fw is 10.38 mm, L is 5.76 mm, and ft is 27.7 mm, but the disclosure is not limited thereto.

In some embodiment, the field of view (FOV) of the zoom lens module 1 is 31.6 to 11.8, where 31.6 is the field of view at the wide end of the zoom lens module 1, and 11.8 is the field of view at the telephoto end of the zoom lens module 1. In some embodiments, the zoom lens module 1 may meet the requirements of continuous optical zooming from 3× to 8×. In some embodiment, the aperture value (f-number, F/#) of the zoom lens module 1 is 3.4 to 4.3, where 3.4 is the aperture value at the wide end of the zoom lens module 1, and 4.3 is the aperture value at the telephoto end of the zoom lens module 1.

Table 1 to Table 3 show an example of the zoom lens module 1. However, data listed in Table 1 to Table 3 is not intended to limit the disclosure. After referring to the disclosure, anyone familiar with this technology may make appropriate changes to the parameters or settings, which should still fall within the scope of the disclosure.

TABLE 1

| Note | Surface | Radius of curvature (mm) | Spacing (mm) | Refractive index | Abbe number |
|---|---|---|---|---|---|
| Target object S | | Infinity | Infinity | | |
| 1st lens element L1 | Surface on object side S11 | 20.302 | 2.473 | 1.545 | 55.987 |
| | Surface on image side S12 | −12.381 | 0.300 | | |
| 2nd lens element L2 | Surface on object side S21 | −7.895 | 0.600 | 1.643 | 22.456 |
| | Surface on image side S22 | −13.039 | D4 | | |
| 3rd lens element L3 | Surface on object side S31 | −4.729 | 0.941 | 1.545 | 55.987 |
| | Surface on image side S32 | 11.436 | 0.998 | | |
| 4th lens element L4 | Surface on object side S41 | 18.666 | 0.740 | 1.643 | 22.456 |
| | Surface on image side S42 | −35.294 | D8 | | |
| Aperture AS | | | 0.300 | | |
| 5th lens element L5 | Surface on object side S51 | 5.029 | 1.875 | 1.545 | 55.987 |
| | Surface on image side S52 | −41.727 | 1.612 | | |
| 6th lens element L6 | Surface on object side S61 | −14.031 | 0.558 | 1.643 | 22.456 |
| | Surface on image side S62 | 25.654 | D13 | | |
| 7th lens element L7 | Surface on object side S71 | 22.642 | 3.162 | 1.545 | 55.987 |
| | Surface on image side S72 | −7.902 | 2.000 | | |
| 8th lens element L8 | Surface on object side S81 | −4.582 | 4.983 | 1.643 | 22.456 |
| | Surface on image side S82 | −7.850 | 3.202 | | |
| Optical filter 9 | Surface on object side S91 | Infinity | 0.210 | 1.517 | 64.167 |
| | Surface on image side S92 | Infinity | 0.500 | | |
| Sensor 10 | Light-sensing surface S10 | Infinity | | | |

In Table 1, spacing refers to the distance from the corresponding surface to the next surface on the optical axis I. For example, a spacing of 2.473 of the surface on the object side S11 indicates that the distance from the surface on the object side S11 to the surface on the image side S12 of the first lens element L1 on the optical axis I is 2.473. Spacings corresponding to the surface on the image side S22, the surface on the image side S42, and the surface on the image side S62 change together with the optical zooming, for which reference may be made to Table 2.

TABLE 2

| | Wide end | Middle position | Telephoto end |
|---|---|---|---|
| F/# | 3.4 | 3.9 | 4.3 |
| D4 | 2.000 | 5.622 | 7.241 |
| D8 | 12.430 | 5.292 | 0.800 |
| D13 | 3.115 | 6.631 | 9.504 |

The aspheric formula is as follows:

$$X = \frac{(1/R)H^2}{1 + \sqrt{1 - (1+K)(H/R)^2}} + AH^4 + BH^6 + CH^8 + DH^{10} + EH^{12} + FH^{14} + GH^{16}$$

where X is the offset in the direction of the optical axis I; R is the radius of the osculating sphere, namely the radius of curvature close to the optical axis; K is the conic constant; H is the aspheric height, namely the height from the center of the lens element to the edge of the lens element. As shown from the formula, different H values correspond to different X values. A, B, C, D, E, F, and G are aspheric coefficients. In an example, the K value on the surface of each lens element is 0, and the aspheric coefficients are as shown in Table 3:

TABLE 3

| Surface | A | B | C | D | E | F | G |
|---|---|---|---|---|---|---|---|
| S11 | 1.86E−04 | −8.39E−06 | 8.94E−08 | 3.73E−09 | 3.08E−12 | 2.68E−13 | 1.02E−14 |
| S12 | 7.29E−04 | −3.18E−05 | 1.08E−06 | −1.28E−08 | 6.29E−12 | 8.80E−13 | 3.40E−15 |
| S21 | 2.52E−03 | −7.00E−05 | 1.46E−06 | −1.60E−08 | 1.09E−11 | 1.46E−13 | 4.11E−14 |
| S22 | 1.88E−03 | −4.32E−05 | 2.10E−07 | 3.68E−09 | 2.16E−11 | 1.45E−12 | 1.20E−14 |
| S31 | 6.14E−03 | −3.84E−04 | 2.19E−05 | −3.90E−07 | −1.83E−09 | −9.85E−11 | 1.30E−11 |
| S32 | 1.73E−03 | 2.09E−04 | −5.88E−05 | 4.43E−06 | −1.14E−07 | −1.62E−10 | 1.33E−11 |
| S41 | −2.44E−03 | 5.16E−04 | −4.88E−05 | 2.36E−07 | 6.23E−08 | −7.55E−10 | −3.26E−11 |
| S42 | −1.07E−03 | 1.90E−04 | −8.92E−06 | −2.14E−06 | 1.48E−07 | −2.27E−09 | −4.00E−11 |

TABLE 3-continued

| Surface | A | B | C | D | E | F | G |
|---|---|---|---|---|---|---|---|
| S51 | −7.69E−04 | −5.11E−05 | −1.61E−05 | 1.08E−06 | −1.87E−07 | 2.53E−09 | 2.24E−10 |
| S52 | 5.27E−05 | −1.22E−04 | −2.91E−05 | 1.95E−06 | −3.80E−08 | 1.04E−09 | −2.32E−10 |
| S61 | 1.46E−02 | −1.98E−03 | 1.01E−04 | 4.23E−06 | −8.81E−08 | −1.97E−08 | −1.14E−09 |
| S62 | 1.59E−02 | −1.46E−03 | 1.48E−05 | 1.75E−05 | −8.96E−07 | 1.59E−08 | −5.80E−09 |
| S71 | −1.64E−04 | −7.30E−05 | −1.13E−05 | 1.38E−06 | 5.02E−08 | −1.57E−08 | 5.66E−10 |
| S72 | 3.97E−04 | −2.20E−04 | −2.28E−05 | 7.30E−06 | −6.04E−07 | 1.78E−08 | −7.00E−11 |
| S81 | 3.84E−03 | −6.67E−04 | 7.55E−06 | 8.50E−06 | 7.07E−08 | −1.08E−07 | 5.13E−09 |
| S82 | 1.82E−03 | 6.75E−05 | −1.11E−04 | 2.49E−05 | −2.85E−06 | 1.73E−07 | −4.36E−09 |

Figure 5:
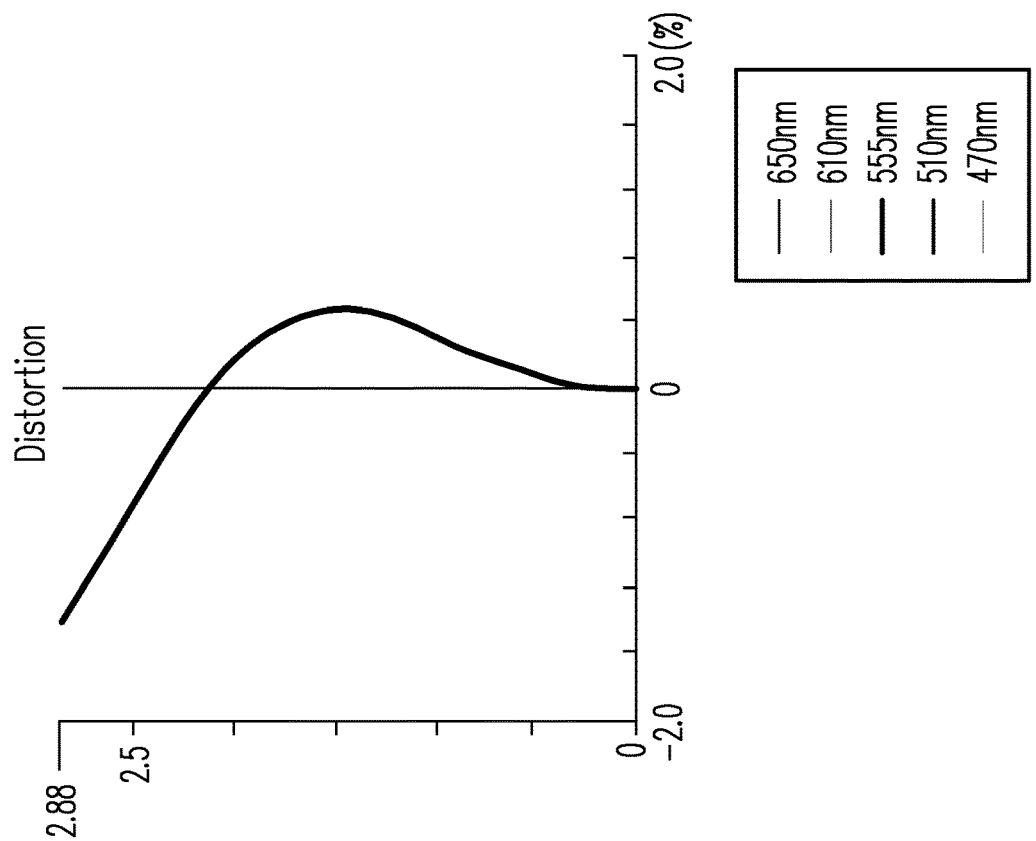
FIG. 4 and FIG. 5 are optical quality reference images at the wide end of a zoom lens module of a first example.
Figure 4:
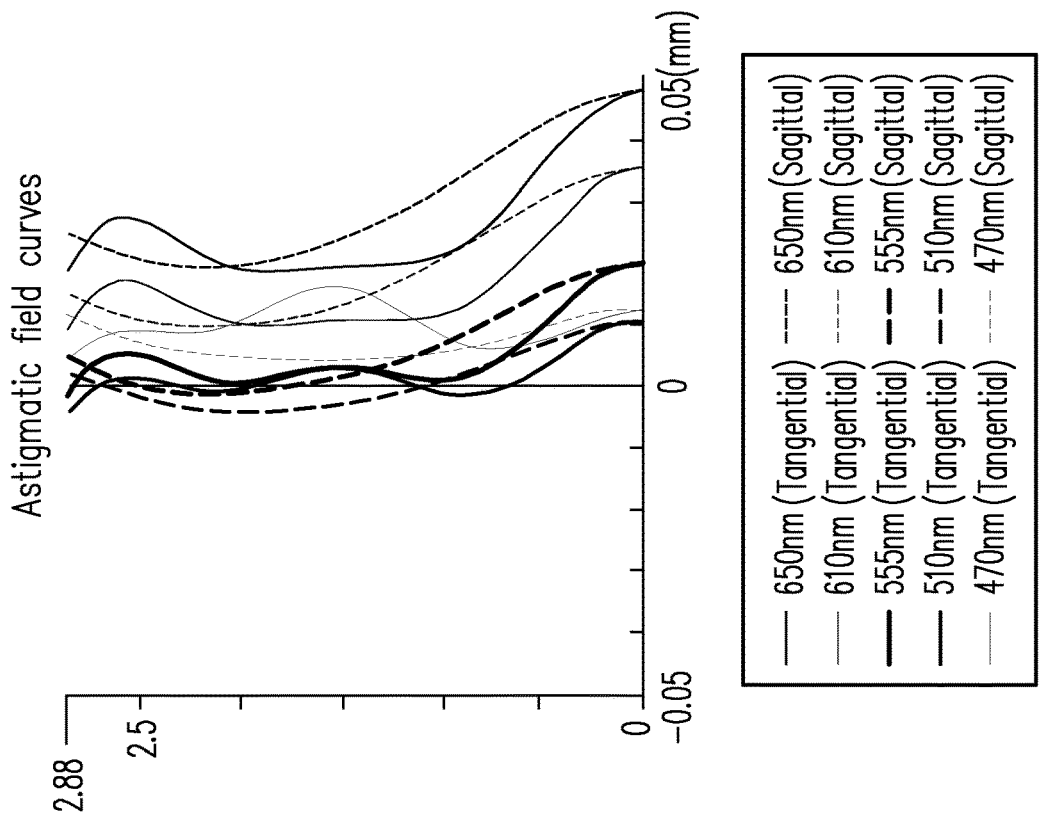
Figures 6, 7:
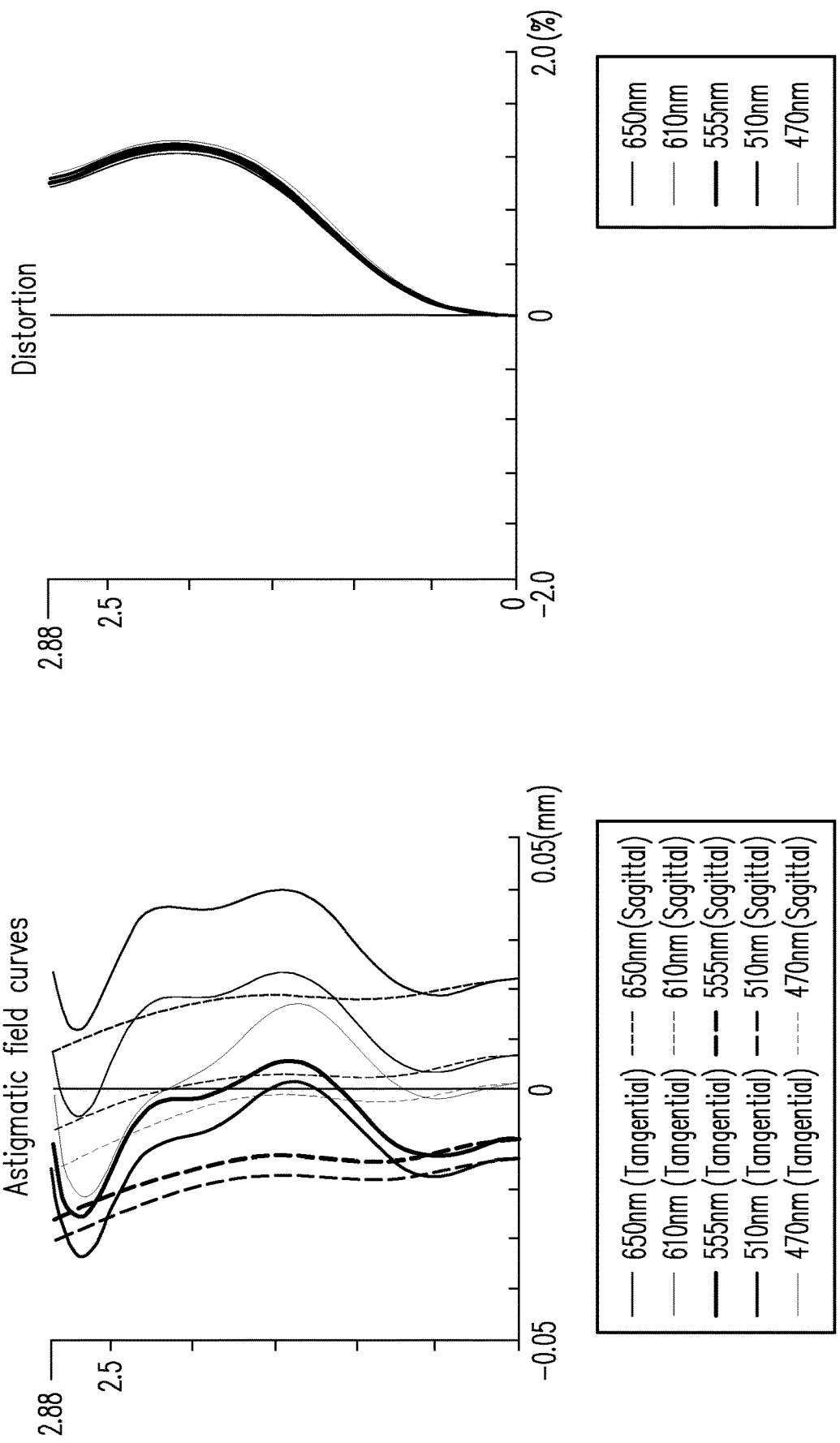
FIG. 6 and FIG. 7 are optical quality reference images at the telephoto end of the zoom lens module of the first example.

FIG. 4 and FIG. 5 are optical quality reference images at the wide end of a zoom lens module of a first example, including an astigmatic field curve image and a distortion image. FIG. 6 and FIG. 7 are optical quality reference images at the telephoto end of the zoom lens module of the first example. FIG. 4 to FIG. 7 show that good imaging quality is exhibited when the focal length is at whichever of the wide end and the telephoto end of the zoom lens module. Therefore, the zoom lens module of this embodiment can maintain the resolution and good imaging quality by optical zooming.

Table 4 to Table 6 show another example of the zoom lens module 1. In this example, the eighth lens element L8 is a spherical lens element. That is, the surface on the object side S81 and the surface on the image side S82 of the eighth lens element L8 are both spherical.

TABLE 4

| Note | Surface | Radius of curvature (mm) | Spacing (mm) | Refractive index | Abbe number |
|---|---|---|---|---|---|
| Target object S | | Infinity | Infinity | | |
| 1st lens element L1 | Surface on object side S11 | 47.891 | 2.163 | 1.545 | 55.987 |
| | Surface on image side S12 | −11.634 | 0.300 | | |
| 2nd lens element L2 | Surface on object side S21 | −9.658 | 0.600 | 1.643 | 22.456 |
| | Surface on image side S22 | −13.533 | D4 | | |
| 3rd lens element L3 | Surface on object side S31 | −5.070 | 0.961 | 1.545 | 55.987 |
| | Surface on image side S32 | 12.319 | 0.301 | | |
| 4th lens element L4 | Surface on object side S41 | 27.028 | 0.799 | 1.643 | 22.456 |
| | Surface on image side S42 | −27.251 | D8 | | |
| Aperture AS | | | 0.306 | | |
| 5th lens element L5 | Surface on object side S51 | 5.676 | 3.834 | 1.545 | 55.987 |
| | Surface on image side S52 | −10.148 | 0.470 | | |
| 6th lens element L6 | Surface on object side S61 | −5.335 | 1.412 | 1.643 | 22.456 |
| | Surface on image side S62 | −19.872 | D13 | | |
| 7th lens element L7 | Surface on object side S71 | 18.406 | 3.136 | 1.545 | 55.987 |
| | Surface on image side S72 | −13.122 | 2.112 | | |
| 8th lens element L8 | Surface on object side S81 | −5.178 | 3.010 | 1.744 | 44.850 |
| | Surface on image side S82 | −8.010 | 4.834 | | |
| Optical filter 9 | Surface on object side S91 | Infinity | 0.210 | 1.517 | 64.167 |
| | Surface on image side S92 | Infinity | 0.500 | | |
| Sensor 10 | Light-sensing surface S10 | Infinity | | | |

TABLE 5

| | Wide end | Middle position | Telephoto end |
|---|---|---|---|
| F/# | 3.4 | 3.9 | 4.3 |
| D4 | 2.000 | 5.623 | 7.340 |
| D8 | 12.314 | 5.203 | 0.800 |
| D13 | 2.744 | 6.233 | 8.918 |

In this example, the K value of each asphere is 0, and the aspheric coefficients are as shown in Table 6:

TABLE 6

| Surface | A | B | C | D | E | F | G |
|---|---|---|---|---|---|---|---|
| S11 | −4.54E−06 | 1.62E−06 | 6.65E−08 | 4.64E−09 | −1.85E−11 | −6.56E−13 | 4.83E−15 |
| S12 | 2.10E−04 | −1.10E−05 | 9.23E−07 | −9.89E−09 | −8.19E−12 | 4.16E−13 | −1.12E−13 |
| S21 | 1.50E−03 | −8.18E−05 | 2.83E−06 | −3.10E−08 | 2.56E−12 | −6.34E−12 | −7.74E−15 |
| S22 | 1.34E−03 | −6.86E−05 | 1.89E−06 | −1.47E−08 | −6.38E−11 | 2.12E−12 | −1.47E−13 |
| S31 | 2.71E−03 | −2.99E−05 | 5.69E−08 | 2.34E−07 | −6.84E−09 | −1.46E−10 | 7.45E−12 |
| S32 | 1.85E−03 | 1.95E−05 | −5.24E−05 | 6.63E−06 | −2.63E−07 | −2.45E−10 | 1.30E−10 |
| S41 | 3.23E−03 | −5.62E−05 | −3.81E−05 | 4.91E−06 | −1.54E−07 | −1.79E−09 | 8.65E−11 |
| S42 | 2.30E−03 | −4.71E−05 | −9.43E−05 | 1.92E−06 | −1.49E−07 | 8.84E−09 | −2.56E−10 |
| S51 | −7.70E−04 | −6.66E−05 | −1.81E−06 | −7.01E−08 | −2.05E−08 | 2.48E−09 | −2.04E−10 |
| S52 | 3.27E−03 | −3.60E−04 | −2.19E−05 | 4.10E−06 | −2.31E−07 | 9.51E−10 | 3.79E−10 |
| S61 | 1.40E−02 | −1.12E−03 | 6.55E−05 | −2.00E−06 | −4.15E−08 | −1.67E−09 | 5.99E−10 |
| S62 | 9.35E−03 | −2.84E−04 | 1.13E−05 | 1.28E−06 | −4.88E−08 | −1.48E−08 | 6.78E−10 |
| S71 | −8.94E−05 | 2.98E−05 | −1.59E−05 | 3.64E−06 | −4.62E−07 | 2.95E−08 | −7.35E−10 |
| S72 | −7.15E−04 | −7.70E−08 | −6.59E−06 | 1.75E−06 | −2.51E−07 | 1.71E−08 | −4.31E−10 |

FIG. 8 and FIG. 9 are optical quality reference images at the wide end of a zoom lens module of a second example, including an astigmatic field curve image and a distortion image. FIG. 10 and FIG. 11 are optical quality reference images at the telephoto end of the zoom lens module of the second example. FIG. 8 to FIG. 11 show that good imaging quality is exhibited when the focal length is at whichever of the wide end and the telephoto end of the zoom lens module. Therefore, the zoom lens module of this embodiment can maintain the resolution and good imaging quality by optical zooming.

In summary of the foregoing, in the embodiments of the disclosure, the second lens element group and the third lens element group move during zooming to realize optical zooming, thus improving the decrease in resolution during conventional zooming and maintaining good imaging quality.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A zoom lens module, comprising a first lens element, a second lens element, a third lens element, a fourth lens element, a fifth lens element, a sixth lens element, a seventh lens element, and an eighth lens element sequentially arranged from an object end to an image end, wherein a number of lens elements with refractive power in the zoom lens module is eight, wherein
   the first lens element and the second lens element form a first lens element group,
   the third lens element and the fourth lens element form a second lens element group,
   the fifth lens element and the sixth lens element form a third lens element group, and
   the seventh lens element and the eighth lens element form a fourth lens element group,
   wherein the first lens element group and the fourth lens element group remain fixed during zooming, and the second lens element group and the third lens element group move during zooming,
   wherein refractive powers of the first lens element group, the second lens element group, the third lens element group, and the fourth lens element group are positive, negative, positive, and positive.

2. The zoom lens module according to claim 1, wherein the second lens element group moves from the object end to the image end during switching from a wide end to a telephoto end.

3. The zoom lens module according to claim 1, wherein the third lens element group moves from the image end to the object end during switching from a wide end to a telephoto end.

4. The zoom lens module according to claim 1, wherein refractive powers of the first lens element, the second lens element, the third lens element, the fourth lens element, the fifth lens element, the sixth lens element, the seventh lens element, and the eighth lens element are sequentially positive, negative, negative, positive, positive, negative, positive, and negative.

5. The zoom lens module according to claim 1, wherein the first lens element to the eighth lens element comprise seven aspheric lens elements and one spherical lens element.

6. The zoom lens module according to claim 1, wherein the first lens element to the eighth lens element are each an aspheric lens element.

7. The zoom lens module according to claim 1, further comprising:
   an aperture located between the fourth lens element and the fifth lens element.

8. The zoom lens module according to claim 1, further comprising:
   a sensor disposed at the image end, wherein the zoom lens module meets following conditions:
   $5<T/L<10$, where T is a total length of lens, and L is a diagonal length of the sensor.

9. The zoom lens module according to claim 1, further comprising:
   a sensor disposed at the image end, wherein the zoom lens module meets following conditions:
   $0.3<(D11*fw)/(L*ft)<0.9$, where D11 is a diameter of the first lens element, fw is an equivalent focal length at a wide end of the zoom lens module, L is a diagonal length of the sensor, and ft is an equivalent focal length at a telephoto end of the zoom lens module.

* * * * *